May 7, 1929.                A. J. MARA                1,712,351
                          LIGHT DEFLECTOR
                        Filed April 5, 1928          2 Sheets-Sheet 1
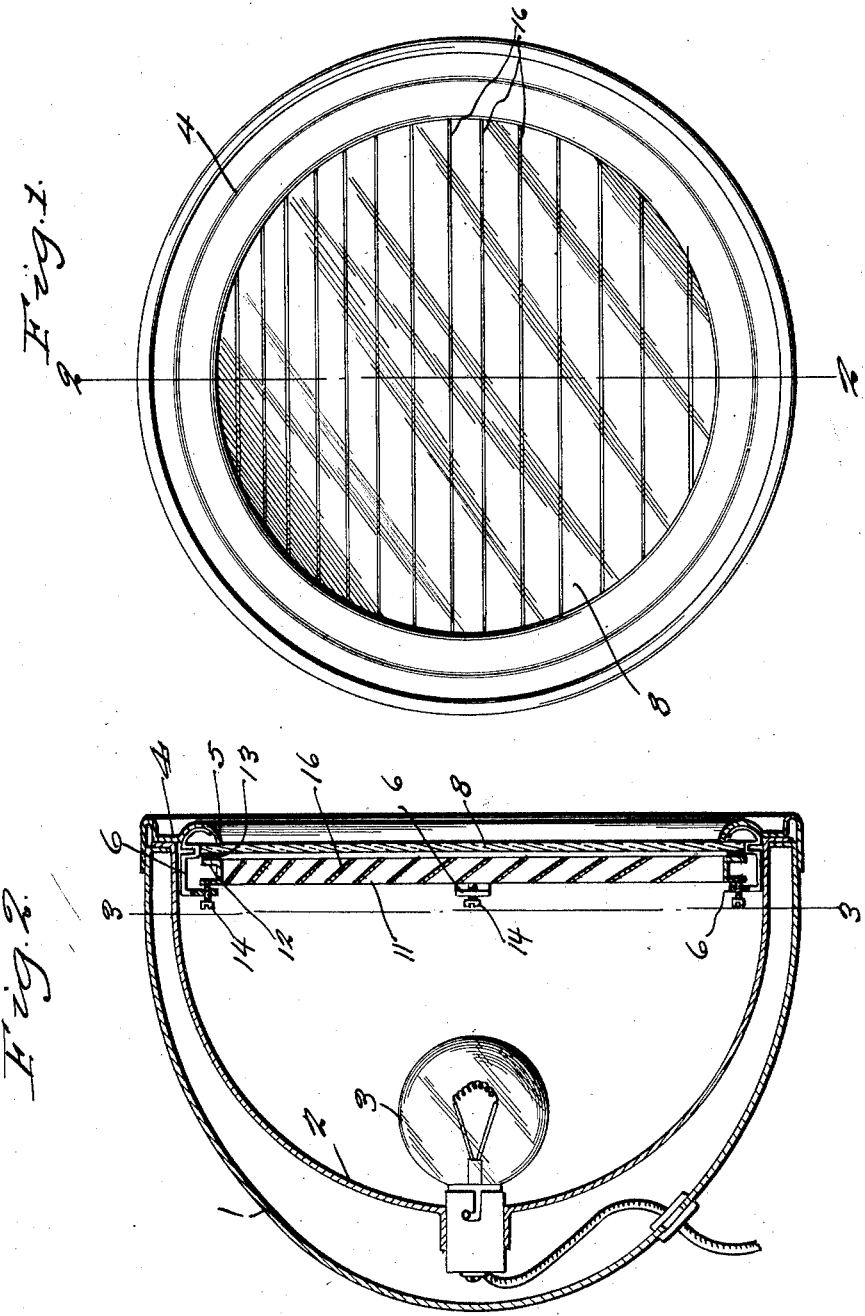

May 7, 1929. A. J. MARA 1,712,351
LIGHT DEFLECTOR
Filed April 5, 1928 2 Sheets-Sheet 2
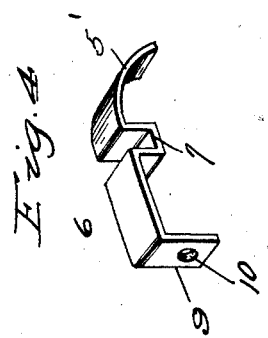
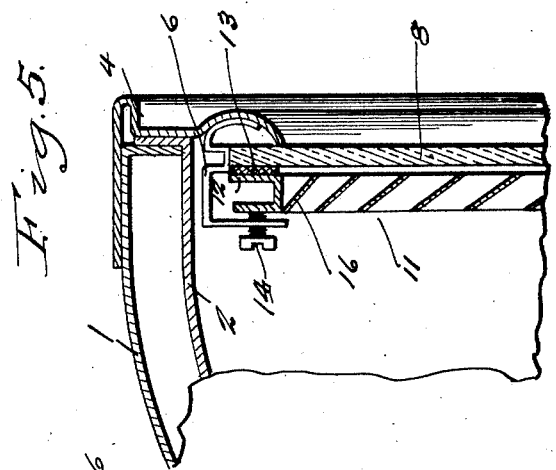
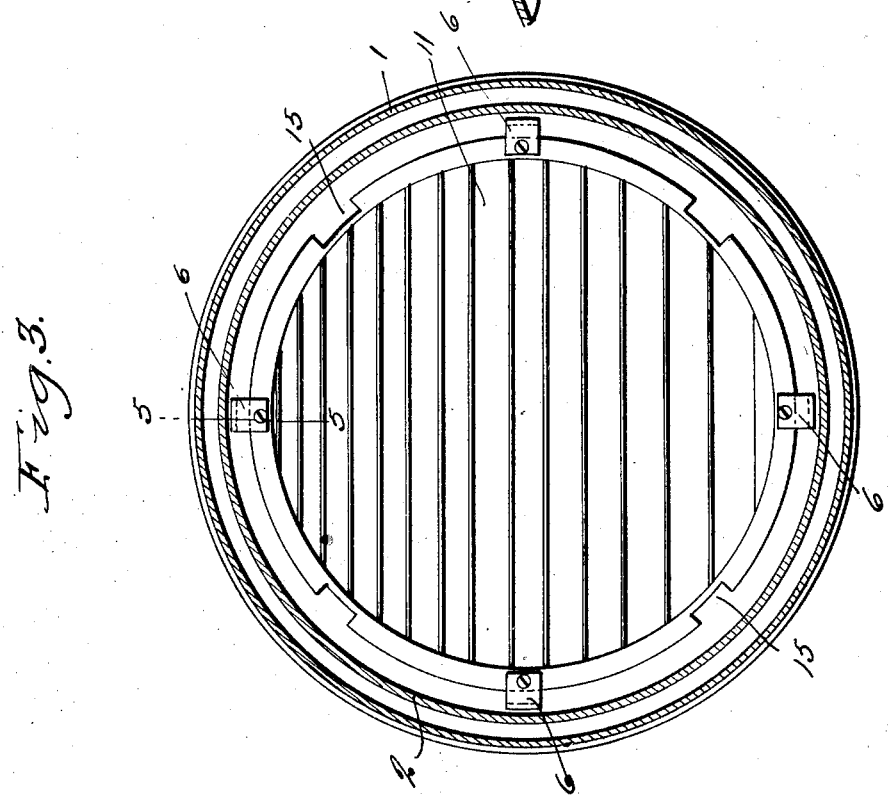

Patented May 7, 1929.

1,712,351

UNITED STATES PATENT OFFICE.

ANTHONY J. MARA, OF BOONTON, NEW JERSEY.

LIGHT DEFLECTOR.

Application filed April 5, 1928. Serial No. 267,643.

My present invention has reference to an attachment for headlamps for automobiles or like vehicles, and is designed to provide a means whereby the light rays from such lamps will be directed downwardly onto the road surface and out of the path of vision of an approaching automobile or pedestrian and whereby accidents resulting from the dazzling lights of automobiles will be effectively prevented.

A further object is the provision of an attachment for this purpose which shall be of a simple construction, cheaply manufactured and readily attached to and removed from any ordinary construction of automobile headlamps.

A further object is the provision of an attachment for this purpose which shall be effectively clamped in the headlamp and which also affords an effective support for the lens of the headlamp.

To the attainment of the foregoing and other objects which will present themselves, the improvement also resides in certain other novel features of construction, combination and operative association of parts, one satisfactory embodiment of which is disclosed by the accompanying drawings.

In the drawings:

Figure 1 is a front elevation of a headlamp equipped with the improvement.

Figure 2 is a sectional view approximately on the line 2—2 of Figure 1.

Figure 3 is a sectional view approximately on the line 3—3 of Figure 2

Figure 4 is a perspective view of one of the clamps detached from the rim of the headlamp.

Figure 5 is an enlarged detail sectional view approximately on the line 5—5 of Figure 3.

In the drawings, the numeral 1 designates the body of an ordinary headlamp for automobiles and 2 the reflector therein and 3 the bulb which has its base received through the reflector. The rim for the headlamp is indicated by the numeral 4 and is of the ordinary construction, the same being provided with the usual bayonet slots, (not shown) to engage with the lugs on the lamp housing 2 (also not shown). The rim 4 is provided with the usual peripheral rounded portion or bead 5 and to this bead I secure at spaced intervals either by soldering, riveting or the like, the curved ends 5′ of the clamps 6 of the improvement. Each clamp 6 is bent upon itself to form the same with a lug 7 and these lugs are designed to contact with the periphery of the lens or glass 8 of the lamp and thereby hold the said lens in proper position in the lamp and sustain the same from movement. The inner ends of each of the clamps 6 is formed with a depending ear 9 that has a threaded opening 10 therethrough.

The body of my improvement is in the nature of a ring member 11. The ring has its outer periphery channeled or its opposite faces formed with outstanding flanges 12, respectively. The outer flange is designed to contact with a compressible gasket 13 that is arranged against the inner face of the lens 8, and the inner face of the flange 12 is designed to be contacted by a headed bolt member 14 that is screwed through the openings 10 in the ears 9.

The ring member has its flange portion 12 provided with equidistantly spaced notches 15 arranged in a line with the bayonet slots in the rim and with the lugs on the lamp housing. These notches are designed to receive the clamps 6 therethrough after the improvement has been attached, through the medium of the bolts 14, to the lens 8 and the rim 4, the rim, lens and my improved light deflector being then turned to bring the lugs on the lamp housing into the offset passages of the bayonet slots.

Arranged transversely between the inner sides of the ring 11 there are preferably equidistantly spaced downwardly inclined shutters 16. These shutters may be of translucent glass or may be of an unbreakable material, suitably colored to prevent the direct rays of light passing therethrough. When the device is attached in a manner as just described, the shutters 16 will be arranged transversely with respect to the lamp housing or in the positions illustrated in Figures 1, 2, 3 and 5 of the drawings. When so arranged it will be noted that the rays of light will pass between the shutters and may be directed downwardly onto the road. The lower edge of one of the shutters is approximately in a line with the upper edge of the next shutter so that straight rays of light cannot be directed between the shutters.

The construction of my improvement and the advantages thereof will, it is thought, be understood without further detailed description but obviously I do not wish to be restricted to the precise structure herein shown and described and, therefore, hold myself entitled to make such changes therefrom as fairly fall within the scope of what I claim.

Having described the invention I claim:

The combination of a headlamp of an automobile or the like, having a detachable rim for holding the lens in the lamp housing, a peripherally grooved and notched shutter carrying ring at the inner face of the lens, and a compressible gasket between the ring and lens, spaced clamps each having one of its ends fixed on the rim and integrally provided with depending lugs to contact with the periphery of the lens, and having their outer ends downturned to provide ears to be received through the notches in the grooved ring and to permit of the said grooved ring being turned to bring its notches out of register with the ears and bolt members screwed through the ears and contacting with the inner face of the ring to compress the latter against the gasket and the lens against the rim.

In testimony whereof I affix my signature.

ANTHONY J. MARA.